(12) United States Patent
Monrad et al.

(10) Patent No.: US 6,212,379 B1
(45) Date of Patent: Apr. 3, 2001

(54) METHOD OF USING ROUTING AREA(RA) UPDATE REQUEST MESSAGES IN ENCRYPTED AND UNENCRYPTED FORMS

(75) Inventors: Atle Monrad, Froland; Ole Jonny Gangsoy, Arendal, both of (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/201,387

(22) Filed: Nov. 30, 1998

(30) Foreign Application Priority Data

Dec. 9, 1997  (NO) ...................................... 975783

(51) Int. Cl.⁷ ...................................... H04Q 7/20
(52) U.S. Cl. .................. 455/435; 455/411; 455/432; 455/433; 455/515; 455/517
(58) Field of Search ...................... 455/435, 432, 455/433, 434, 410, 411, 515, 517; 380/48

(56) References Cited

U.S. PATENT DOCUMENTS 5,546,464 * 8/1996 Raith et al. ............................ 380/48
5,588,043 * 12/1996 Tiedemann, Jr. ..................... 455/435

FOREIGN PATENT DOCUMENTS 344180   11/1998  (CN) .

OTHER PUBLICATIONS

Global System for Mobile Communications, GSM 03.60 v. 5.0.0 1997–06, Digital cellular telecommunications system (Phase 2+); General Packet Radio Service (GPRS); Service description; Stage 2 (GSM 03.60 version 5.0.0), European Telecommunications Standards Institute.

* cited by examiner

Primary Examiner—Fan Tsang
Assistant Examiner—Philip J. Sobutka
(74) Attorney, Agent, or Firm—Nixon & Vanderhye P.C.

(57) ABSTRACT

The present invention relates to a method for routing area (RA) update request messages which in accordance with a time period broadcasted from the network are periodically sent from an MS (Mobile Station) to an SGSN (Serving GPRS Support Node) through a BSS (Base Station System), which SGSN supports GPRS (General Packet Radio Service), and which as a result of a routing area update procedure will return an appropriate accept message, and for the purpose of taking into account the differentiation in nature of normal routing area update procedure and periodic updates, it is according to the present invention suggested that for the purpose of simplifying said routing area update procedure, there is broadcasted a new indicator from the network together with the time periode for the periodic routing updates, said indicator being adapted to determine whether the periodic routing update procedure is performed ciphered instead of unciphered.

10 Claims, 1 Drawing Sheet

Intra SGSN Routing Area Update Procedure

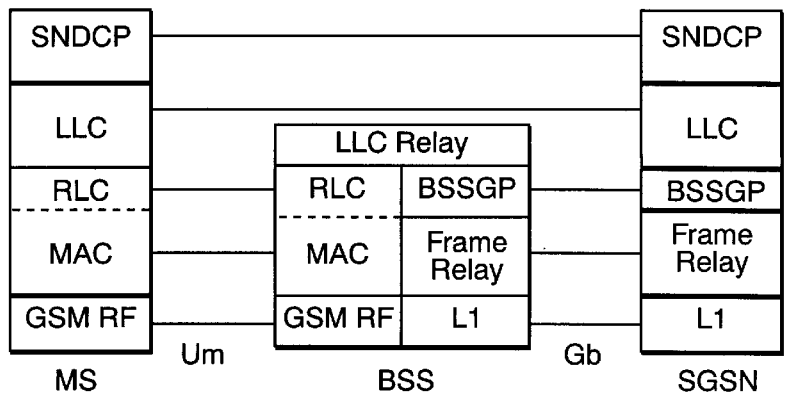
Fig. 1 GPRS Protocol Stack
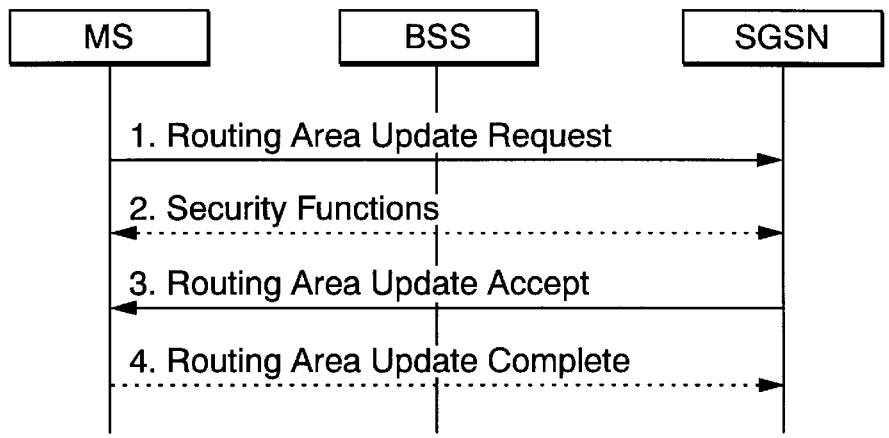
Fig. 2 Intra SGSN Routing Area Update Procedure
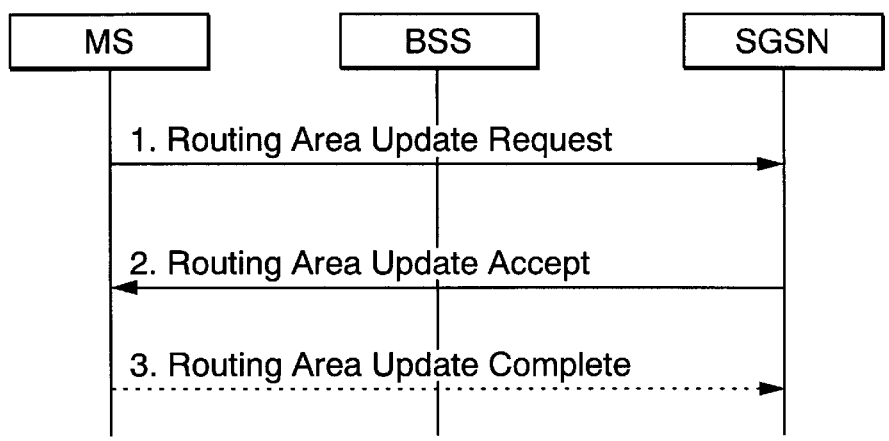
Fig. 3 Periodic SGSN Routing Area Update Procedure

METHOD OF USING ROUTING AREA (RA) UPDATE REQUEST MESSAGES IN ENCRYPTED AND UNENCRYPTED FORMS

FIELD OF THE INVENTION

The present invention relates to a method for routing area (RA) update request messages which in accordance with a time period broadcasted from an associated network are periodically sent from an MS (Mobile Station) to an SGSN (Serving GPRS Support Node) through a BSS (Base Station System), which SGSN supports GPRS (General Packet Radio Service), and which as a result of a routing area update procedure will return an appropriate accept message.

BACKGROUND OF THE INVENTION

GPRS (General Packet Radio Service), that is currently being specified by ETSI as a service for GSM phase 2+, provides packet switched connections throughout the PLMN (Public Land Mobile Network). The packet switching is performed between the nodes in the network and on the radio interface.

The most critical part of the transmission is between an MS (mobile station) and the SGSN (Serving GPRS Support Node). The unpredicatable change of the position of an MS has led to a wish for quite frequent update messages from the MS towards the network. These frequent messages cause a load on both the air interface and internally within the SGSN.

The protocol stack for GPRS between MS and SGSN is sketched in FIG. 1.

For the mobile telephony system to know the position of a mobile station and whether the mobile station really has radio contact with the system, periodic messages from the mobile stations are specified. The time period between the periodic messages is broadcasted from the network towards the mobile stations. With a scenario of 100.000 attached subscribers and 15 minutes updating interval, a considerable number of routing update procedures must be performed every minute. This will consume a significant part of the total processor capacity for the SGSN.

The current procedure will be discussed in the following:

Routing Area Update Request messages shall be sent unciphered, since in the inter-SGSN routing area update case the new SGSN shall be able to process the request.

The intra SGSN routing area update procedure is illustrated in FIG. 2. The example assumes that the MSC/VLR is not changed during the routing update. Each step is explained in the list illustrated in FIG. 2.

1) The MS sends a Routing Area Update Request (TLLI, new CI, old RAI, new RAI) to the SGSN. CI is added in the BSS to reduce the load on the radio interface.
2) Security functions may be executed.
3) The SGSN validates the MS's presence in the new RA. If, due to regional, national or international restrictions, the MS is not allowed to attach in the RA or subscription checking fails, then the SGSN rejects the routing update with an appropriate cause. If all checks are successful then the SGSN updates the MM context for the MS. A new TLLI may be allocated. A Routing Area Update Accept (TLLI, Cause) is returned to the MS.
4) If TLLI was changed, the MS acknowledges the new TLLI with Routing Area Update Complete (TLLI). If the routing area update procedure fails a maximum allowable number of times, or if the Routing Area Update Accept Cause parameter indicates a reject, the MS shall enter IDLE state.

The working assumption does not take into account the differentiation in nature of the normal routing area update procedure (always in an unknown area) and periodic updates (always in a known area).

OBJECTS OF THE PRESENT INVENTION

An object of the present invention is to provide a method by which the shortcomings of the prior art are eliminated.

Another object of the present invention is to provide a method for routing area update request messages wherein the processor load consumption is reduced.

Still another object of the present method is to take into account the differentiation in nature of the normal routing area update procedure and periodic updates.

BRIEF SUMMARY OF THE INVENTION

The above objects are achieved in a method as stated in the preamble, which according to the present invention is characterized in that for the purpose of simplifying said routing area update procedure, there is broadcasted a new indicator from the network together with the time periode for the periodic routing updates, said indicator being adapted to determine whether the periodic routing update procedure is performed ciphered instead of unciphered.

In other words, it is proposed that a new indicator is broadcasted from the network together with the time periode for the periodic routing updates. This indicator determines whether the periodic routing update procedure is performed ciphered instead of unciphered as normally. This leads to a new variant of routing area update. It is also possible to add a second information element from the SGSN, to indicate the number of consecutive periodic routing area updates to perform before a routing area update procedure involving security finctions is carried out.

Further features and advantages of the present invention will appear from the following description taken in conjunction with the enclosed drawings, as well as from the appending patent claims.

BRIEF DISCLOSURE OF THE DRAWINGS

FIG. 1 is a sketch illustrating the protocol stack for GPRS between MS and SGSN.

FIG. 2 is a list illustrating a prior art intra SGSN routing area update procedure.

FIG. 3 is a list illustrating a periodic SGSN routing area update procedure according to the present invention.

DESCRIPTION OF EMBODIMENTS

From the previous description it should be noted that FIG. 1 is a sketch illustrating the protocol stack for GPRS between MS and SGSN, whereas FIG. 2 is a list illustrating the intra SGSN routing area update procedure according to prior art.

With reference to FIG. 3 it will now be given a detailed description of how an embodiment of the method according to the present invention can be carried out.

The periodic SGSN routing area update procedure is illustrated in FIG. 3. Each step is explained in the list illustrated therein.

1) The MS sends a Routing Area Update Request (TLLI, CI, RAI, periodic RA indicator) to the SGSN. CI is added in the BSS to reduce the load on the radio interface. The MS initiates the periodic routing area update procedure only in case of no change of routing area. The MS may decide to perform e.g. every 5th periodic RA update as a normal RA-update in order to possibly change authentication data.

2) The fact that the SGSN recognises the message after deciphering, and that the periodic RA indicator is present, validates the MS's presence in the RA. The SGSN updates the MM context for the MS. A new TLLI may be allocated. A Routing Area Update Accept (TLLI, Cause) is returned to the MS.

3) If TLLI was changed, the MS acknowledges the new TLLI with Routing Area Update Complete (TLLI). If the routing area update procedure fails a maximum allowable number of times, or if the Routing Area Update Accept Cause parameter indicates a reject, the MS shall enter IDLE state.

The proposed solution can be characterised by providing a simpler periodic routing area update procedure. By letting the procedure be ciphered, it is verified that the correct subscriber is addressed.

The invention makes it possible to have a more efficient handling of periodic update messages, as they occur in a known routing area and thereby can be handled as other information known by both the MS and the SGSN. The information can then e.g. be sent in ciphered form.

Further, the method according to the present invention may be defined by sending an indicator to the mobile stations, for thereby being able to handle the periodic routing area update procedures in ciphered or encrypted or unciphered or unencrypted form according to operator's wishes.

Further, the method according to the present invention makes it possible to let the mobile stations, at certain defined intervals, handle the periodic routing area updates as ordinary routing area updates in order to perform security functions.

Still further, the present invention defines the principle of letting the periodic routing area update procedure be sent in ciphered or unciphered form.

What is claimed is:

1. Method for routing area (RA) update request messages which in accordance with a time period broadcasted from a network are periodically sent from an MS (Mobile Station) to a Service node, and which as a result of a routing area update procedure will return an appropriate accept message, the method comprising:

for the purpose of simplifying said routing area update procedure, broadcasting an indicator from the network together with the time period for the periodic routing updates, said indicator being adapted to determine whether the periodic routing update procedure is performed encrypted instead of unencrypted, and said MS sending an encryption indicator with update request messages to said service node for indicating whether an update request message is in encrypted or unencrypted form.

2. Method as claimed in claim 1, further comprising adding an information element from said Service Node, which information element indicates the number of consecutive periodic routing updates to be performed before a routing area update procedure involving security functions may be effected.

3. Method as claim in claim 2, characterized in that the involved MS initiates the periodic routing area update procedure only in case of no change of routing area.

4. Method as claimed in claim 2, characterized in that when the Service Node recognizes the message after deciphering and the presence of said indicator, then the Service Node will validate the presence of the involved MS in the routing area, whereby the MM context of said MS is updated and possibly a new TLLI (Temporary Logic Link Identity) may be allocated.

5. Method as claim in claim 1, characterized in that the involved MS initiates the periodic routing area update procedure only in case of no change of routing area.

6. Method as claimed in claim 5, characterized in that when the Service Node recognizes the message after deciphering and the presence of said indicator, then the Service Node will validate the presence of the involved MS in the routing area, whereby the MM context of said MS is updated and possibly a new TLLI (Temporary Logic Link Identity) may be allocated.

7. Method as claimed in claim 5, characterized in that the involved MS is adapted to decide to perform only some periodic RA updates as an unencrypted RA update in order to possibly change authentication data.

8. Method as claimed in claim 7, characterized in that when the Service Node recognizes the message after deciphering and the presence of said indicator, then the Service Node will validate the presence of the involved MS in the routing area, whereby the MM context of said MS is updated and possibly a new TLLI (Temporary Logic Link Identity) may be allocated.

9. Method as claimed in claim 1, characterized in that when the Service Node recognizes the message after deciphering and the presence of said indicator, then the Service Node will validate the presence of the involved MS in the routing area, whereby the MM context of said MS is updated and possibly a new TLLI (Temporary Logic Link Identity) may be allocated.

10. A method for sending routing area (RA) update request messages in a telecommunications network, the method comprising the steps of:

a mobile station periodically sending RA update request messages to a service node of the network;

the service node returning an accept message to the mobile station in response to certain of the RA update request messages received by the service node; and wherein certain of the RA update request messages sent by the mobile station are sent periodically in encrypted form, while other of the RA update request messages sent by the mobile station are sent in unencrypted form, and wherein the mobile station transmits an encryption indicator along with the RA update request messages for indicating whether the messages are in encrypted or unencrypted form.

* * * * *